United States Patent Office 3,551,837
Patented Dec. 29, 1970

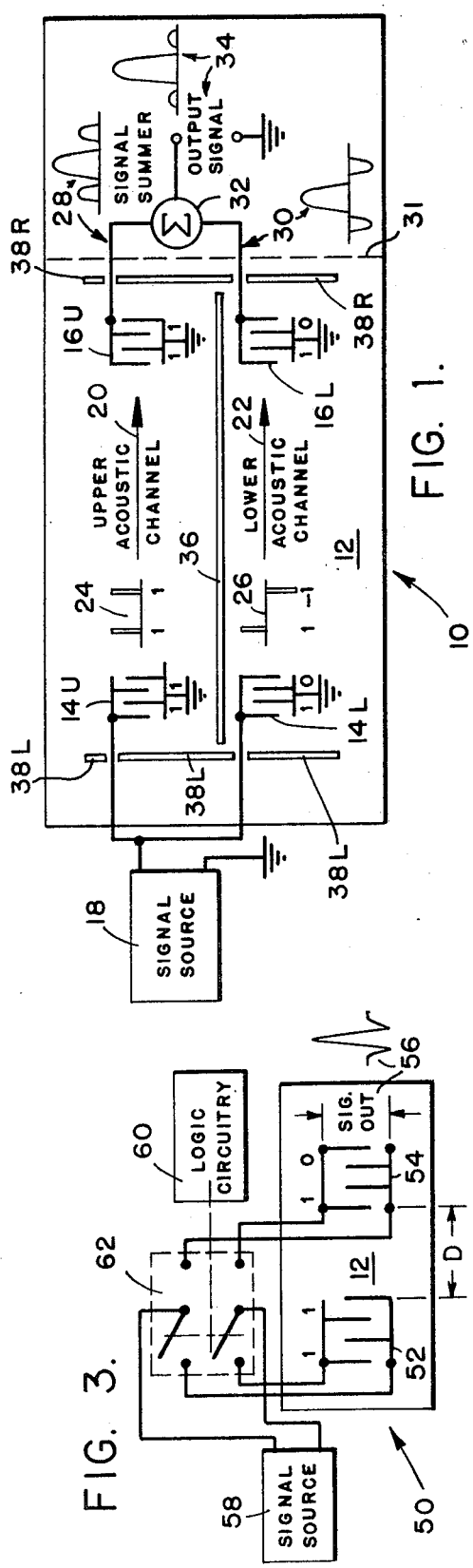
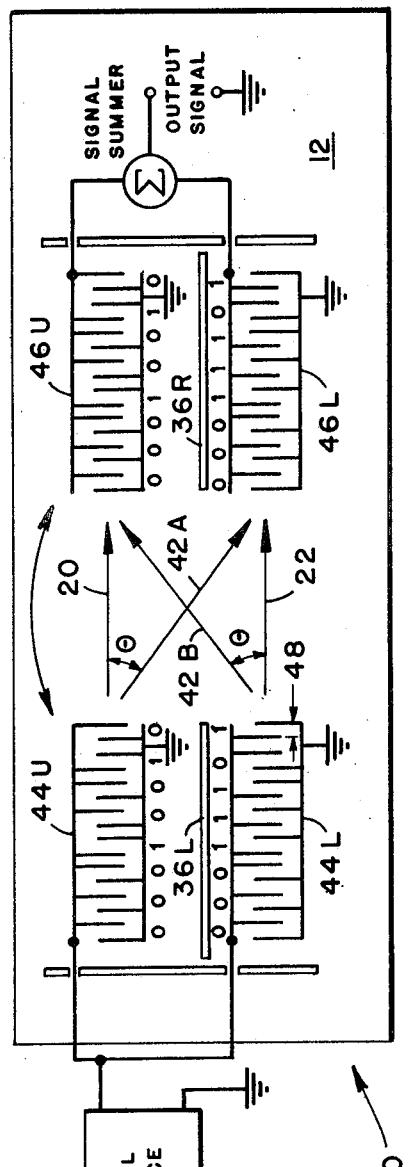
FIG. 1.
FIG. 2.
FIG. 3.
INVENTORS.
JEFFREY M. SPEISER
HARPER JOHN WHITEHOUSE
BY ERVIN F. JOHNSTON
ATTORNEY.
JOHN STAN, AGENT.

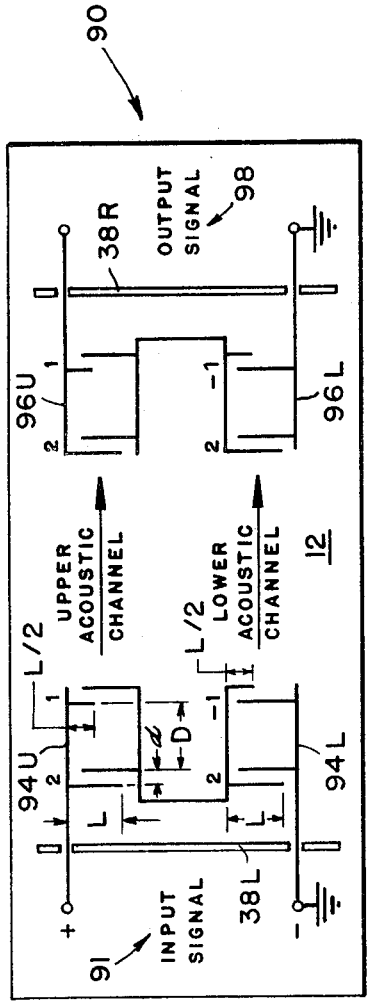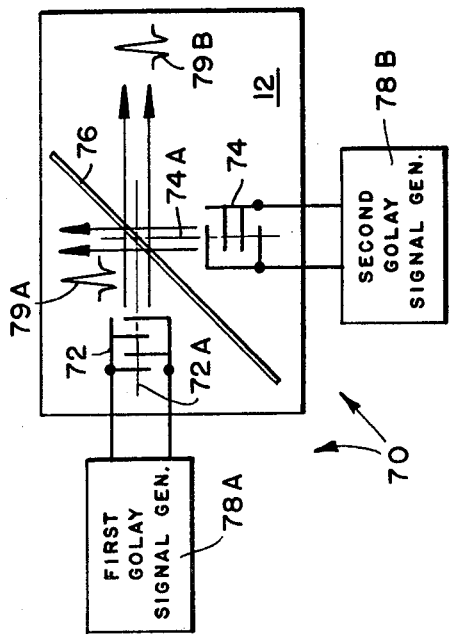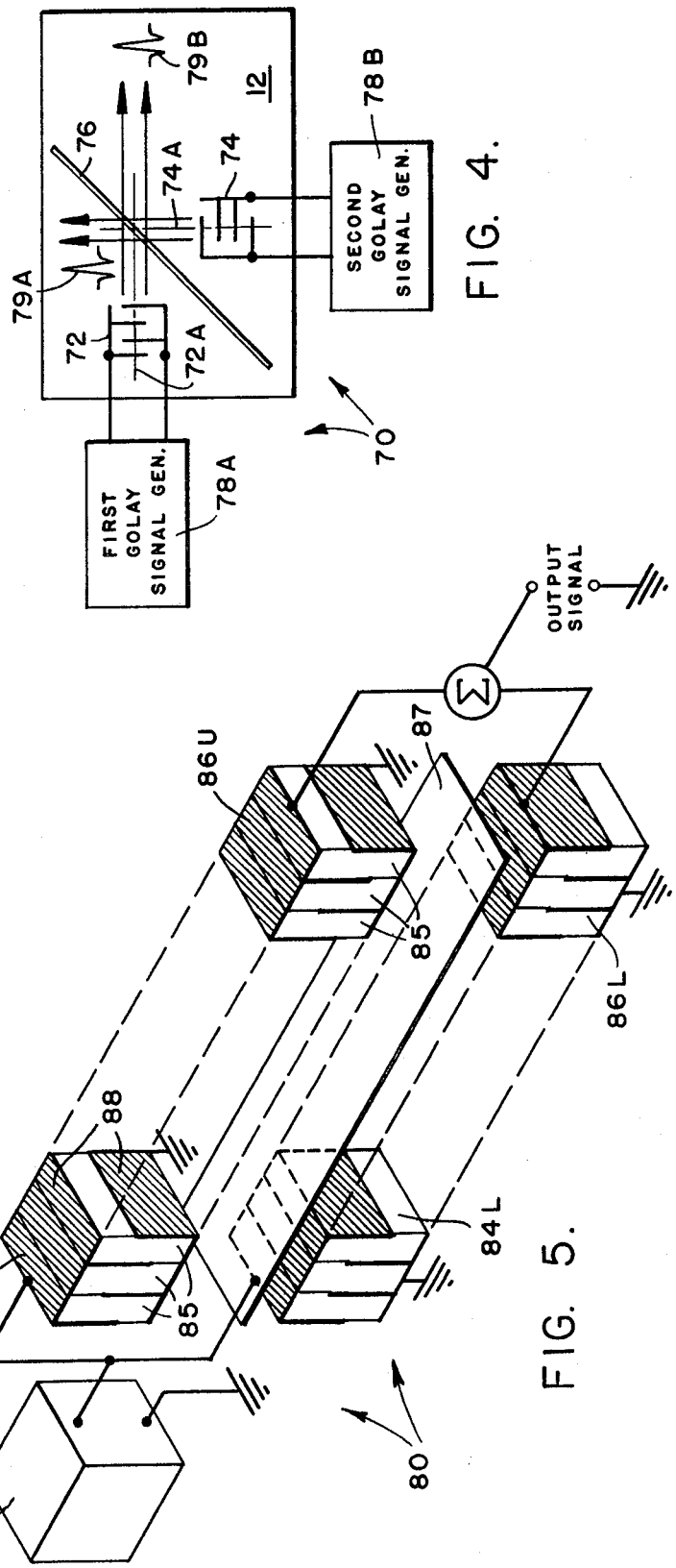

3,551,837
SURFACE WAVE TRANSDUCERS WITH SIDE LOBE SUPPRESSION
Jeffrey M. Speiser, Pasadena, and Harper John Whitehouse, Hacienda Heights, Calif., assignors to the United States of America as represented by the Secretary of the Navy
Filed Aug. 13, 1969, Ser. No. 849,667
Int. Cl. H03h 7/30, 9/00
U.S. Cl. 333—30                                                   19 Claims

ABSTRACT OF THE DISCLOSURE

An acoustic wave device including a plurality of sets of interdigitated transducers, wherein a plurality of distinct acoustic paths are utilized, one for each transducer set, with each transducer having wanted and unwanted temporal lobes, the plurality of propagating signals being combined so as to produce one resultant signal. The interdigitations of the transducers are so configured that the unwanted transducer temporal side lobes are combined in such a manner as to be reduced in magnitude in the resultant signal, in comparison with the magnitude of the main lobe. Moreover, the wanted signal components may be combined in such a manner as to appear in the resultant signal with a greater amplitude than in any one distinct signal. The distributed-transducer acoustic wave device may include at least a pair of inter-digitated electrodes which are coded to correspond with a mathematical series of two elements known as a Golay complementary series, or sequence. This type of configuration results in a pulse output for a pulse input, and is effectively a wideband amplifier.

---

The invention described herein may be manufactured and used by or for the Government of the United States of America for governmental purposes without the payment of any royalties thereon or therefor.

In the field of interdigitated transducers, the interdigitations are either uncoded or coded in a special configuration. Whether coded or uncoded, it has not been possible in the prior art to obtain a pulse output, given a pulse input, although Barker-coded interdigitated configurations have given approximately a pulse output for a pulse input.

It has been discovered that, by the use of two pairs of interdigitated transducers, each pair of which is coded according to a specialized type of coding, namely, that corresponding to a mathematical series known as a Golay series, it is possible to obtain a wideband surface or volume wave amplifier. As a result, pulses having a large amplitude and a short duration may be obtained, thereby giving the resulting transducer configuration or combination the advantage of a high bandwidth elemental transducer with the large amplitude output pulses of a distributed transducer.

Accordingly, one object of the present invention is the provision of a wideband acoustic wave device.

Another object is to provide an acoustic wave device which is capable of providing a pulse output for a pulse input.

A further object of the invention is the provision of an acoustic wave device capable of cancellation of unwanted signal components in the input.

Still another object of the invention is the provision of an acoustic wave device capable of amplifying pulse inputs.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein:

FIG. 1 shows a schematic diagram of a distributed-transducer acoustic wave device comprising two pairs of Golay complementary pair, with two identical pairs of transducers separated by an isolator stripe.

FIG. 2 is a schematic diagram of a more complex complementary pair, showing a situation where the isolation between the upper channel signal transmission path and the lower signal transmission path is imperfect.

FIG. 3 shows a schematic diagram wherein pulse-in pulse-out response is obtainable using only a single Golay complementary pair, however using two generators or, as shown, one generator with a preselected delay for one of the elements of the pair.

FIG. 4 is a schematic diagram showing an arrangement of a pair of Golay complementary transducers capable of generating an acoustic signal in two orthogonal directions.

FIG. 5 is a partly schematic, partly three-dimensionally diagrammatic, view of two pairs of Golay complementary transducers used for generating a volume wave.

FIG. 6 is a schematic diagram showing a non-Golay configuration wherein cancellation of unwanted components in the output is accomplished by selective variation in the length of individual interdigitations of the pair of transducers.

Before discussing the figures in detail, a brief summary of the invention will be given in general terms.

From a very broad standpoint, the invention relates to temporal minor lobe suppression. More specifically, it relates to an acoustic wave device including a plurality of sets of interdigitated transducers, wherein a plurality of distinct signals are produced, one signal for each transducer set, with each signal containing wanted and unwanted components, the plurality of signals being combined so as to produce one resultant signal. The interdigitations of the transducers are so configured that the unwanted signal components are combined in such a manner as to be reduced in magnitude in the resultant signal, in comparison with the magnitude of the wanted components in the distinct signals. Generally, the wanted signal components are combined in such a manner as to appear in the resultant signal with a greater amplitude than in any one distinct signal.

The cancellation of the unwanted components and the amplification of the wanted components, usually one, are effected by using the transducers in pairs, often a complementary pair, so called because the effect produced on a signal by one transducer is the complement of the effect produced by the other transducer of the pair. The mathematical operation performed by each of the pair of transducers is a correlation function.

Briefly defined, an auto-correction function is an integral of the product of the function by the same function but displaced in time. For example, the auto-correlation function of $g(u)$ is equal to the integral $\int g(u)g(t+u)du$. The cross-correlation function is the integral of the product of one function $g_1(u)$ by another function $g_2(t+u)$.

There are other ways, besides the use of complementary pairs of transducers, to interdigitate the transducers to result in a configuration which performs a correlation function. Once the principle of cancellation of unwanted components of the signal, for example unwanted side lobes, has been established, then it can readily be determined which of several methods are feasible for accomplishing this.

Discussing now a series which plays an important role in this disclosure, a Golay complementary series may be defined as a pair of equally long, finite sequences of two kinds of elements, for example, the binary numbers, the 0 and the 1, which have the property that the number of pairs of like elements with any given separation in one series is equal to the number of pairs of unlike elements with the same separation in the other series.

For instance, the two series 1001010001 and 1000000110 have, respectively, three pairs of like and three pairs of unlike adjacent elements, four pairs of like and four pairs of unlike alternate elements, and so forth for all possible separations.

These series have possible applications in communication engineering, for when the two kinds of elements of these series are taken to be +1 and −1, it follows immediately from their definition that the sum of their two respective auto-correlation series is zero everywhere except for the center term.

The Golay series may be interpreted in two different manners. From one standpoint, it consists of two unlike elements, one element being considered the complement of the other. The unlike elements may be, for example, the two binary digits, the 0 and the 1. On the other hand, and this is what is done in correlation theory, one of the elements may be considered a +1 and the other element a −1.

From another standpoint, the Golay series may be considered to be a string of functions, for example, a string of Dirac delta functions. The delta functions may be weighted in amplitude or be positive or negative in sign.

Referring now to FIG. 1, therein is shown a schematic diagram of a preferred embodiment of an acoustic surface wave device 10, comprising a crystal substrate 12, upon which is disposed at least one pair of transducer sets, each set consisting of a pair of transducers, 14U and 16U, and 14L and 16L. Each transducer of one transducer pair 14U and 14L serves as an input transducer, which, upon application of a signal to it, for example, generated by a signal source 18 causes acoustic wave propagation, in upper and lower acoustic propagation channels 20 and 22, respectively, upon the surface of the substrate 12.

When a single pulse is generated by the signal source 18, acoustic signals which may be represented by the waveforms shown by reference numerals 24 and 26 are generated by the input Golay complementary pair 14U and 14L, respectively, with the right-hand pulse, for example, the −1 pulse of pulse train 26, being transmitted first in time. Signal source 18 may generate either discrete signals or continuous signals.

Each transducer of the other Golay transducer pair 16U and 16L, serves as an output transducer. It is to be noted that the input transducers 14U and 14L and the output transducers 16U and 16L are aligned in the direction 20 or 22 of acoustic wave propagation; and that each input transducer is interdigitated identically to the output transducer that it is aligned with. The pair of input transducers, 14U and 14L as well as the pair of output transducers 16U and 16L form a Golay complementary pair. The suffixes "U" and "L" designate "upper" and "lower."

The crystal substrate 12 generally consists of a piezoelectric crystal, for example, quartz. However, the substrate 12 may be a nonpiezoelectric insulator, upon which are deposited the interdigitations, and over which a piezoelectric is deposited. An isolator divider strip 36 is positioned between each transducer set 14U and 16U, and set 14L and 16L, to prevent unwanted cross-coupling between signals in the upper and lower acoustic signal channels 20 and 22. An absorber stripe 38L and 38R at each end of a transducer set prevents unwanted back reflections from occurring.

An acoustic surface wave device may include at least one other pair of transducer sets disposed upon the crystal substrate 12, with all the transducer sets being situated upon the crystal substrate in a parallel relationship, with an isolator divider strip, similar to isolator divider strip 36, disposed between each transducer set.

Still referring to FIG. 1, but discussing now the mathematical basis for the invention, transducer 14U is identical to transducer 16U, and transducers 14L and 16L are identical. Moreover, transducer 14U is the Golay complementary pair to transducer 14L.

The reason that two identical transducers are used in upper signal transmission channel 20 and lower signal transmission channel 22 is that the output signal traversing two identical transducers is then equal to the convolution of the input signal with the autocorrelation function of the input transducer or the output transducer. That is, the impulse response is the autocorrelation function of the transducer coding. Advantage is taken here of the fact that the autocorrelation functions of the two members of the Golay complementary pair have equal and opposite side lobes. Along one acoustic path, the upper signal transmission channel 20, a first autocorrelation function is generated whereas along the second signal transmission path, lower signal transmission channel 22, a second autocorrelation function is generated which is the complement of the first autocorrelation function. It is for this reason that the two transducers in each signal transmission channel are identical.

It will be noted that the inputs from signal source 18 to the input transducers 14U and 14L are connected together, and also that the outputs 28 and 30 of the output transducers 16U and 16L are connected together through a signal summer 32.

The binary designation of a Golay complementary pair is usually the conventional binary designation, a 1 and a 0, as shown below each of the transducers in FIG. 1. However, to supply a clearer picture of the manner in which the various pulses coact with each other, they are pictured as positive and negative pulses, as shown by reference numerals 24 and 26. Also, if the mathematical operation of autocorrelation is performed, a more nearly correct answer is obtained if the two unlike elements be considered as a +1 and a −1. The autocorrelation of the sequence 1, 1 gives the sequence 1, 2, 1 as a result. The autocorrelation of the complementary Golay sequence 1, −1 after operation by the autocorrelation function results in the sequence −1, 2, −1, and is shown by reference numeral 30. The two wave forms, the one designated by reference numeral 28 having two positive side lobes, the other one being designated by reference numeral 30 and having two negative side lobes, are added together in the signal summer 32 to result in an output signal 34 having substantially no side lobes. In an ideal configuration 10, there would be no side lobes whatsoever in the output signal 34.

In FIG. 1 the dashed line 31 is meant to designate that everything to its right, particularly the signal summer 32, need not be disposed on the substrate 12 itself, but may be mounted on a separate, insulating, unit.

Upon examining the figures, it will be seen that the unlike elements of the transducers are designated by 1's and 0's, whereas, in FIG. 1, the pulses representing the 1's and the 0's are shown as pulses having a value of +1 and −1. This is so because when the Golay series is considered to consist of the elements −1 and +1, it presents a more realistic physical picture of the waves across the surface of the substrate 12. As may be seen from FIG. 1, in the upper signal transmission channel 22, the transducers 14U and 16U are configured to correspond to one member +1, +1 of a Golay series. These numbers may be said to correspond to two successive sine waves having a value of +1 and propagating across the upper channel 20. In a similar manner, the lower signal transmission channel 22 may be said to transmit two successive sine waves, one having a value of +1 and the other wave transmitted later in time, having a value of −1.

The signal shown at 28 appears at the output of the output transducer 16U of the upper channel 20, while the signal at 30 appears at the output of the lower channel output transducer 16L. It will be noted that the two major lobes of each output signal 28 and 30 are of the same amplitude and of the same polarity while the two side lobes are of the same amplitude but of opposite polarities, thus resulting in a side lobe cancellation. When these two output signals 28 and 30 are added in the signal summer 32, the output signal shown at 34 is obtained, consisting of a single major lobe. Of course, it must be realized that in practice complete cancellation cannot be obtained, and lobes of some small amplitude may appear, in the output 34, as shown in FIG. 1. Also, in actual practice, the major and minor lobes would have a relative width greater than that shown in this figure, due to the fact that the upper and lower signal transmission paths or channels 20 and 22 are not of infinite bandwidth. Nevertheless, this would not affect the fact that substantial cancellation of unwanted signal components would take effect.

In a very real sense, the Golay-type complementary transducer can be said to constitute a high-bandwidth transducer. It is a broadband transducer which couples the signal from the input to the output more effectively than a simpler transducer of fewer interdigitations. The same bandwidth may be obtainable by using a nonuniformly weighted complementary sequence transducer, but the amplitude is much greater when Golay-type transducers are used.

FIG. 1 shows operation using two parallel signal transmission channels, that is, the two signals are added in a parallel manner. Circuitry can very readily be constructed which operates in a serial mode to achieve the same results. What is important is that the input signal to both input transducers be identical and that the output signals also join together in a summing box or summer.

Still referring to FIG. 1, when the acoustic path is long and there are two paths, then there is a possibility of cross coupling between the signal traversing one acoustic path 20 and a signal traversing the other acoustic path 22. One manner in which the undesired coupling can be reduced is by having one or more additional pairs of sets of transducers located parallel to the original transducer sets. The interdigitations of the additional transducer pairs can be so coded that when all the signals are summed up in a summer, the unwanted signal components vanish in the output, or at least the first-order spatial side lobe components vanish. The added transducer pairs of sets would, generally, also consist of Golay complementary pairs. Of course, the additional transducers would occupy substrate space; however, this is the price that would have to be paid to produce a clearer signal. Generally, two sets of Golay complementary pairs, consisting of another parallel arrangement of four transducers similar to that already shown in FIG. 1, would have to be added to be effective in side lobe suppression. However, partial suppression of minor lobes may be accomplished by the use of only two additional transducers forming a single Golay complementary pair.

There are two ways in which side lobe suppression may be accomplished, with the use of Golay complementary pairs of transducers. One method has already been discussed, namely, the addition of more Golay complementary pairs parallel to the original ones.

Another method, shown in FIG. 2, by which side lobe suppression may be achieved is by making the longer paths indicated by reference numerals 42A and 42B longer than the direct acoustic signal paths 20 and 22 by a predetermined amount. It will be noted that the isolator divider strip 36 of FIG. 1, is divided into two segments 36L and 36R in FIG. 2.

This second manner of side lobe suppression involves a time-sharing scheme, particularly useful for certain types of Golay sequences. The method of side lobe suppression heretofore described, in connection with FIG. 1, will work for all transducer pairs patterned after a Golay series. The method to be described which follows only works for certain specific Golay series, to be described immediately below.

FIG. 2 shows an embodiment of an acoustic surface wave device 40 where the isolation between the two propagation paths 20 and 22 is inadequate. This could cause unwanted cross-coupling of signals, which would be a particularly severe problem if for some reason it is desired to have a long time delay between the input transducers and the output transducers. Requiring a long delay time is equivalent to requiring a small angle $\theta$ in FIG. 2.

FIG. 2 shows an acoustic surface wave device 40 wherein the spacing between the input transducers 44U and 44L and output transducers 46U and 46L is such that the diagonal distance 42A or 42B between a Golay complementary pair of transducers 44U and 46L or 44L and 46U is greater than the distance 20 or 22 between two identical transducers 44U and 46U or 44L and 46L by an even multiple of the basic spacing 48 of two successive individual interdigitations, thereby effecting an even more complete unwanted signal component cancellation than that obtainable when the diagonal distance is not so chosen.

Discussing now in more mathematical detail the second method of side lobe suppression illustrated in FIG. 2, in this figure, the Golay series or sequence after which the transducer configurations are patterned is restricted to be a Golay sequence derived from Golay's algorithm. In essence, Golay's algorithm states that if A and B are two Golay complementary sequence pairs, then $A'=AB$ and $B'=A\overline{B}$ are also Golay complementary sequence pairs. AB means the sequence designated by A, for example, 1,1, placed alongside the sequence designated by B, for example, 1,0, making the new sequence $A'$ equal to 1,1,1,0. Similarly $A\overline{B}$ becomes 1,1,0,1.

Sequences generated by means of Golay's algorithm have at least one other desirable property beside that of complementarity. They have the property that the cross-correlation function represented by the interdigitations will vanish for all even shifts of the pulses. Thus, if the delay along the undesired path 42A or path 42B in FIG. 2 is made longer than the length of the desired direct path 20 or 22 by an even multiple of the basic spacing 48 between two successive individual interdigitations, then one-half of the time the undesired terms representing undesired components will be cancelled. If it is then desired to use the structure 40 as a delay line, then an input is supplied by input signal source 18 only one-half of the time and an output is obtained only one-half of the time. By this means all unwanted coupling is removed. But, of course, effectively, the bandwidth is reduced by a factor of two by this means.

The other earlier described technique of using more parallel Golay-type transducers reduces the amount of available substrate space by a factor of two. Essentially then, there are two alternate methods of reducing the amplitude of the unwanted side lobes.

FIG. 3 shows an embodiment 50 in which only a single pair of transducers 52 and 54 is used to develop a pulse output 56. Herein is shown a surface wave device 50, comprising a crystal substrate 12 upon which are disposed two interdigitated transducers, an input transducer 52 and an output transducer 54, coded to form a Golay complementary pair, and aligned upon the crystal substrate in the same direction as the direction of an acoustic signal which may be caused to propagate from the input transducer to the output transducer. Each of the two transducers 52 and 54 is adaptable for connection to a signal source 58 which generates a signal consisting of a sequence of pulses corresponding to the Golay coding of the transducer to which the generator is connected at a specific instant by double-pole double-throw switch 62. The two signals generated by the two transducers 52 and 54 have a time delay $\tau$, which is a function of the distance D between the two transducers 52 and 54, such that, in the output 56 of the output transducer 54, any unwanted component due to one of the signals is substantially cancelled by another unwanted component due to the other signal. Signal source 58 produces successively a signal pulse sequence which corresponds to the Golay coding transducer 52 and then a pulse sequence which corresponds to the Golay coding of transducer 54. The sequencing is shown schematically as being performed by logic circuitry 60 controlling the sequencing of a switch 62.

In the embodiment shown in FIG. 3, the signal generated by generator 58 must be delayed in time $\tau$ for a duration equal to the time it takes an acoustic signal to traverse the distance D between the two transducers 52 and 54. Otherwise, the two signals will not be added in the proper phase in the output 56, and hence the desired cancellation will not take effect. The foregoing process assumes acoustic signal propagation from left to right, as shown.

If right-to-left acoustic signal propagation is desired, with an output signal from transducer 52, then the pulses to transducer 52 produced by signal source 58 must be delayed by the same time duration $\tau$ with respect to the pulses to transducer 54.

Instead of using one signal source 58 as shown in FIG. 3, two signal sources, each generating a signal to only one of the transducers 52 or 54, could be used, with the proper time delay $\tau$ between the two signals, thereby channeling the proper sequence of pulses to one or the other of the transducers, as required.

Referring now to an embodiment wherein two acoustic outputs are obtainable, there is shown in FIG. 4 an acoustic surface wave device 70 comprising a crystal substrate 12 upon which are disposed two interdigitated transducers 72 and 74, each defining an axis, 72A and 74A, respectively, through its middle, forming a Golay complementary pair positioned, in this instance, at right angles to each other. An acoustic half-transmitting, half-reflecting, strip 76 disposed between the two transducers 72 and 74 passes through the point of intersection of the two axes 72A and 74A. The strip 76 may be either metal or dielectric deposited on the surface of the substrate 12, or may be a groove cut into the surface of the substrate. The strip 76 makes an angle of 45° with the two axes 72A and 74A.

Each of the two transducers 72 and 74 may be connected to first and second Golay signal generators 78A and 78B, respectively, capable of generating a sequence of pulses which correspond to the Golay-type coding of the interdigitations of the respective transducer. It will be noted that, if the axes 72A and 74A drawn through both of the transducers 72 and 74 coincide at the reflecting strip 76, and the strip is at 45° to each axis, then there is the same delay between the end of each of the transducers and the reflecting strip, and no additional delay need be provided for either transducer to make the two acoustic signals add at the proper phase to form an output signal.

With respect to the orientation of the two transducers 72 and 74 with respect to the crystal axes of the material of the substrate 12, they should be on the basal plane if the crystal is hexagonal like quartz, cadmium sulfide CdS, or zinc oxide ZnO. Otherwise, they should be so oriented that they satisfy the condition of forming equal angles on either side of the reflecting strip 76, with both signals arriving simultaneously at the strip.

In FIG. 4 there are actually two acoustic outputs obtainable, one at the right-hand edge of substrate 12, and one at the top edge of substrate. It must be remembered that substrate 12 must be a material which is capable of transduction, for example, quartz. The right-hand output is the sum of the two acoustic waves moving toward the right-hand side, the acoustic wave generated by transducer 72 moving directly from left-to-right, while the acoustic wave generated by transducer 74 first moves upwardly to reflecting strip 76, and is then reflected to the right, in phase with the first, direct, wave. Similarly, the resultant upward moving signal is also the sum of the two acoustic waves moving upwardly toward the top edge. In each case, the two acoustic waves being summed are the autocorrelation functions of the Golay patterns.

Diagonal strip 76 is the acoustic equivalent to a half-mirrored surface, for example, of the type used in a Michelson interferometer. The output signal from transducer 72 is the autocorrelation function of the input signal generated by first Golay signal generator 78A. The output signal at the output of each transducer is equal to the sum of the autocorrelation function represented by the respective transducer configuration. Inasmuch as the diagonal acoustic half-mirror or strip 76 transmits one-half the acoustic signal and reflects one-half the acoustic signal from each transducer 72 or 74, assuming no losses, each output signal is equal to the sum of one-half the autocorrelation function corresponding to transducer 72 plus one-half of the autocorrelation function generated by transducer 74.

Each output, at the upper and right-hand edges, is equivalent to a single short pulse as designated by reference numerals 79A and 79B. The output pulses 79A and 79B are sharp high-amplitude acoustic pulses, useful for example, for generating an acoustic pulse in some medium.

FIG. 5 is a simplified sketch of a volume-type or bulk-type transducer patterned after a Golay complementary series. A comparison of FIG. 5 with FIG. 1 will show the essential difference in construction between a surface wave transducer 10 and a volume wave transducer 80. The individual crystal plates 85 are all part of a single crystal substrate which has been cut into the individual segments. Metal is then deposited on the appropriate surfaces as shown in this figure, and the plates are then pressed together in the same crystal alignment with respect to the crystal axes as before the crystal substrate 12 had been cut into the individual sections 85.

The material, not shown, between the transducers of each set, for example between transducers 84U and 86U, could be any acoustic propagating material such as a crystal or even water. Also not shown are various supports holding all components in proper juxtaposition to each other. One component would be isolator sheet 87, which would include a viscous sound-absorbing material.

It will be noted that, if a section be taken through the crystal plates 85 in a direction perpendicular to the flat surfaces of the deposited metal 88, and consequently parallel to the front surface of the volume wave transducer 80, the profile will resemble the surface wave transducer 10 shown in FIG. 1. It must be realized that the deposited metal 88 is of extremely small thickness and in an actual sample cannot be readily distinguished from a line of separation wherein no deposited metal appears. The metal serving as an electrode 88 is shown greatly exaggerated in thickness for clarity of illustration.

In a Golay complementary pair of transducers, all of the individual fingers of the interdigitated transducers are of the same size. If it were desired to use cancellation of unwanted signal components by a nonuniformly weighted complementary sequence method, then intergiditated transducers could be used wherein the individual fingers of the transducers are weighted in amplitude and polarity in a proper predetermined manner, thus achieving cancellation of unwanted signal components. While nonuniform amplitudes of the fingers can be used, they are much more difficult to design into a transducer.

A simple embodiment 90 is shown in FIG. 6. These are complementary series of transducers, 94U and 94L, and 96U and 96L, wherein the complementarity is achieved by tailoring the size of the individual fingers or interdigitations to be of a precise value, with the size of the corresponding finger of the other member of the series then being determined.

Accordingly, FIG. 6 shows a schematic diagram of an acoustic surface wave device 90, wherein the lengths, designated L and L/2, of the individual interdigitations of each transducer set, 94U and 96U and 94L with 96L, are so chosen as to result in substantial cancellation of unwanted components and amplification of the wanted components when the plurality of signals, two in this case, is combined.

In this embodiment 90, the two upper transducers 94U and 96U are identical, as are the two lower transducers 94L and 96L. It will be particularly noted that the individual interdigitations are not of the same length, but are of two different lengths L/2 and L. Of course the lengths need not be limited to two. Furthermore, it will be noted that the upper input transducer 94U is connected to the lower input transducer 94L and the upper output transducer 96U is connected to the lower output transducer 96L.

A key feature of the embodiment 90 is that the spacing D between the two inner interdigitations is much greater than the basic spacing d between two adjacent interdigitations. Another important feature is that no isolator strip is needed between the sets of transducers to obtain useful results, although absorber stripes 38L and 38R are needed at each end of the transducer sets.

Discussing now the autocorrelation function of, first, the upper set of transducers 94U and 96U, shown in FIG. 6, either of these transducers may be represented by the unnormalized values 2,1, as indicated on the drawing. The autocorrelation function of this pair of numbers is 2,5,2. Either of the lower transducers 94L and 96L may be represented by the pair of numbers 2, −1, again as shown. The autocorrelation function of this pair of numbers results in the numbers −2, 5, −2. When the acoustic signals corresponding to these two sets of numbers 2, 5, 2 and −2, 5, −2 are summed in the output, they give a resultant output signal 98 which corresponds to the number triplet 0, 10, 0.

It will be readily appreciated that obtaining unwanted signal component cancellation by this method of varying the relative amplitudes, spacing and polarities of the individual interdigitations requires more complex transducer configurations than by the method which involves using transducers which correspond to Golay complementary pairs.

Obviously, many modifications and variations of the present invention are possible in the light of the above teachings. It is therefore to be understood that within the scope of the appended claims the invention may be practiced otherwise than as specifically described.

What is claimed is:

1. An acoustic wave device including at least one set of interdigitated transducers disposed upon a substrate, wherein a plurality of distinct acoustic signal paths are utilized, one for each transducer set, with each transducer output having wanted and unwanted temporal lobes, the plurality of propagating signals being combined so as to produce one resultant signal, wherein
the interdigitations of the transducers are so configured that the unwanted transducer temporal lobes are combined in such a manner as to be reduced in magnitude in the resultant signal, in comparison with the magnitude of the main lobe.

2. An acoustic wave device according to claim 1 wherein
the wanted signal components are combined in such a manner as to appear in the resultant signal with a greater amplitude than in any one distinct signal.

3. An acoustic wave device according to claim 2 wherein the acoustic wave device is a surface wave device.

4. An acoustic wave device according to claim 2 wherein the acoustic wave device is a volume wave device.

5. An acoustic wave device according to claim 2 wherein the lengths of the individual interdigitations of each transducer set are so chosen as to result in substantial cancellation of unwanted components and amplification of the wanted components when the plurality of signals is combined.

6. An acoustic wave device according to claim 2 wherein a transducer set comprises a pair of transducer members, the interdigitations of each member of a transducer pair being arranged according to a Golay complementary pair.

7. An acoustic wave device according to claim 6 wherein the acoustic wave device is a volume wave device.

8. An acoustic wave device according to claim 6 wherein the acoustic wave device is a surface wave device.

9. An acoustic surface wave device according to claim 8 comprising:
a crystal substrate;
at least one pair of transducer sets, each set consisting of a pair of transducers disposed upon the crystal substrate,
one transducer of each transducer set serving as an input transducer, which, upon application of a signal to it, causes acoustic wave propagation on the surface of the crystal substrate,
one transducer of each transducer set serving as an output transducer;
the input and output transducers being aligned in the direction of acoustic wave propagation;
each input transducer being interdigitated identically to the output transducer that it is aligned with; and
the pair of input transducers, as well as the pair of output transducers, forming a Golay complementary pair.

10. An acoustic wave device as recited in claim 9 wherein the substrate consists of a piezoelectric crystal.

11. An acoustic surface wave device as recited in claim 10 wherein the piezoelectric crystal is quartz.

12. An acoustic surface wave device as recited in claim 11, further comprising:
an isolator divider strip positioned between each transducer set; and
an absorber stripe at each end of a transducer set.

13. An acoustic surface wave device as recited in claim 12, including:
at least one other pair of transducer sets disposed upon the crystal substrate;
the transducer sets being situated upon the crystal substrate in a parallel relationship, with
an isolator divider strip positioned between each transducer set.

14. An acoustic surface wave device according to claim 12 wherein the spacing between the input and output transducers is such that the diagonal distance between a Golay complementary pair of transducers is greater than the distance between two identical transducers by an even multiple of the basic spacing of two successive individual interdigitations, thereby effecting an even more complete unwanted signal component cancellation.

15. An acoustic wave device according to claim 2, further being a surface wave device, comprising:
a crystal substrate;
two interdigitated transducers, an input transducer and an output transducer, coded to form a Golay complementary pair disposed and aligned upon the crystal substrate in the same direction as the direction of an acoustic signal which may be caused to propagate from the input transducer to the output transducer;
each of the two transducers being adaptable for connection to a signal source which generates a signal consisting of a sequence of pulses corresponding to the Golay coding of the transducer to which the generator is connected, with the two signals generated by the two transducers having a time delay which is a function of the distance between the two transducers, such that, in the output of the output transducer, any unwanted component due to one of the signals is substantially cancelled by another unwanted component due to the other signal.

16. An acoustic surface wave device according to claim 15, wherein
the two transducers are adaptable for connection to a single signal source;
a sequencing switch connected to the signal source and to each of the transducers for connecting each of the two transducers successively to the signal source; and logic circuitry for controlling the sequencing switch, thereby determining the desired time delay in the succession of pulses to the two transducers.

17. An acoustic wave device according to claim 2, further being a surface wave device, comprising:
a crystal substrate;
two interdigitated transducers, each defining an axis through its middle, forming a Golay complementary pair disposed upon the substrate at right angles to each other;
an acoustic half-transmitting half-reflecting strip disposed between the two transducers, passing through the point of intersection of the two axes;
the two transducers each being adaptable for connection to a signal source capable of generating a sequence of pulses which correspond to the Golay-type interdigitations of the respective transducer.

18. An acoustic surface wave device according to claim 17 wherein
the two transducers are at such relative distances with respect to the strip that there is sufficient transit time delay difference for the acoustic signal to travel from one transducer to the strip to enable one signal source to be used for generating pulses corresponding to both sequences of the Golay complementary pair, properly spaced one with respect to the other.

19. An acoustic surface wave device according to claim 8, wherein
the substrate is a non-piezoelectric insulator, but a piezoelectric is deposited over the interdigitated transducer.

References Cited

UNITED STATES PATENTS

| | | | |
|---|---|---|---|
| 3,289,114 | 11/1966 | Rowen | 333—30 |
| 3,360,749 | 12/1967 | Sittig | 333—30 |
| 3,376,572 | 4/1968 | Mayo | 333—72X |
| 3,446,974 | 5/1969 | Seiwatz | 333—72X |
| 3,446,975 | 5/1969 | Adler et al. | 333—72X |

ELI LIEBERMAN, Primary Examiner

T. VEZEAU, Assistant Examiner

U.S. Cl. X.R.

310—9.7, 9.8; 333—72